(12) United States Patent
Sanghvi

(10) Patent No.: US 12,425,098 B2
(45) Date of Patent: Sep. 23, 2025

(54) SYSTEMS, METHODS, AND APPARATUSES FOR GENERATING RESOURCE TRANSMISSIONS USING SATELLITE-BASED COMMUNICATIONS

(71) Applicant: BANK OF AMERICA CORPORATION, Charlotte, NC (US)

(72) Inventor: Siten Sanghvi, Jersey City, NJ (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 350 days.

(21) Appl. No.: 18/136,101

(22) Filed: Apr. 18, 2023

(65) Prior Publication Data

US 2024/0356630 A1 Oct. 24, 2024

(51) Int. Cl.
H04B 7/185 (2006.01)
H04L 5/00 (2006.01)
H04W 64/00 (2009.01)

(52) U.S. Cl.
CPC ....... H04B 7/18513 (2013.01); H04L 5/0055 (2013.01); H04L 5/0092 (2013.01); H04W 64/00 (2013.01)

(58) Field of Classification Search
CPC .. H04B 7/18513; H04B 7/1851; H04B 7/185; H04B 7/18508; H04B 7/18558; H04B 7/18541; H04B 7/18539; H04B 7/18565; H04L 5/0055; H04L 5/0092; H04W 64/00; H04W 84/06; H04W 72/04; H04W 72/23; H04W 88/02; H04W 72/21; H04W 36/06;

(Continued)

(56) References Cited

U.S. PATENT DOCUMENTS 7,185,805 B1  3/2007  McShirley
7,475,808 B1  1/2009  Bishop
(Continued)

FOREIGN PATENT DOCUMENTS

EP    3537362 A1    9/2019
EP    4465710 A1 * 11/2024 ............ H04W 84/06
(Continued)

*Primary Examiner* — Lana N Le
(74) *Attorney, Agent, or Firm* — Moore & Van Allen PLLC; Lauren M. Stokes

(57) ABSTRACT

Systems, computer program products, and methods are described herein for generating resource transmissions using satellite-based communications. The present invention is configured to identify a user device, wherein the user device comprises a satellite-based communication component; generate, by the user device, a resource transmission request; determine, based on the satellite-based communication component, a satellite-based communication transmission volume; generate, based on the satellite-based communication transmission volume, a resource transmission satellite communication, wherein the resource transmission satellite communication comprises at least a portion of the resource transmission request; transmit, via a satellite component, the resource transmission satellite communication to a resource transmission processing component; and allow, in an instance where the at least one resource account meets the resource transmission request, the resource transmission request.

20 Claims, 8 Drawing Sheets

(58) Field of Classification Search
CPC ..... H04W 12/03; H04W 16/02; H04W 4/025; H04W 48/04; H04W 74/006; H04W 88/182; H04W 16/10; H04W 64/006; H04W 76/00; H04W 76/11
See application file for complete search history.

(56) References Cited

U.S. PATENT DOCUMENTS

| | | | |
|---|---|---|---|
| 8,596,527 | B2 | 12/2013 | Bishop |
| 8,646,685 | B2 | 2/2014 | Bishop |
| 8,794,509 | B2 | 8/2014 | Bishop |
| 8,820,633 | B2 | 9/2014 | Bishop |
| 8,831,677 | B2 | 9/2014 | Villa-Real |
| 8,851,369 | B2 | 10/2014 | Bishop |
| 8,875,990 | B2 | 11/2014 | Bishop |
| 9,900,082 | B1 * | 2/2018 | Chowdhury .......... H04W 84/06 |
| 10,567,141 | B2 | 2/2020 | Rainish |
| 11,528,709 | B2 * | 12/2022 | Moroga ................ H04W 72/23 |
| 11,600,179 | B1 | 3/2023 | Roy |
| 2002/0042778 | A1 | 4/2002 | Nel |
| 2005/0182714 | A1 | 8/2005 | Nel |
| 2006/0280199 | A1 * | 12/2006 | Lane .................. H04B 7/18513 |
| 2009/0271278 | A1 | 10/2009 | Bishop |
| 2010/0255850 | A1 * | 10/2010 | Kaukoranta .......... H04W 72/04 |
| 2016/0342966 | A1 | 11/2016 | Shader |
| 2021/0091988 | A1 * | 3/2021 | Papasakellariou .... H04W 72/04 |
| 2022/0191910 | A1 * | 6/2022 | Zheng .................. H04W 72/21 |

FOREIGN PATENT DOCUMENTS

| | | | |
|---|---|---|---|
| ES | 2426220 T3 | 10/2013 | |
| KR | 101934293 B1 | 1/2019 | |
| KR | 102530888 B1 | 5/2023 | |
| RU | 2381557 C2 | 2/2010 | |
| WO | WO-2022153574 A1 * | 7/2022 | ............. H04B 7/185 |
| WO | WO-2025015277 A1 * | 1/2025 | ......... H04B 7/18541 |

* cited by examiner

SYSTEMS, METHODS, AND APPARATUSES FOR GENERATING RESOURCE TRANSMISSIONS USING SATELLITE-BASED COMMUNICATIONS

FIELD OF THE INVENTION

The present invention embraces a system for generating resource transmissions using satellite-based communications.

BACKGROUND

Users of electronic networks, especially wireless and cellular networks, have a harder time than ever transmitting messages, accessing online applications, and transmitting electronic resources when electronic networks are unavailable or down. For instance, and in certain geographic locations, electronic networks may be difficult to access or use for users and their devices. Further, and still, the problem is exacerbated where such a lack of electronic network availability leads to an inability to use particular applications, such as for resource transmissions. Thus, there exists a need for a system to accurately, efficiently, and securely transmit resource transmission and resource transmission requests when cellular and wireless networks are unavailable.

Applicant has identified a number of deficiencies and problems associated with generating resource transmissions using satellite-based communications. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating resource transmissions using satellite-based communications is provided. In some embodiments, the system comprises: a memory device with computer-readable program code stored thereon; at least one processing device operatively coupled to the at least one memory device and the at least one communication device, wherein executing the computer-readable code is configured to cause the at least one processing device to perform the following operations: identify a user device, wherein the user device comprises a satellite-based communication component; generate, by the user device, a resource transmission request, wherein the resource transmission request is associated with at least one resource account; determine, based on the satellite-based communication component, a satellite-based communication transmission volume; generate, based on the satellite-based communication transmission volume, a resource transmission satellite communication, wherein the resource transmission satellite communication comprises at least a portion of the resource transmission request; transmit, via a satellite component, the resource transmission satellite communication to a resource transmission processing component; and allow, in an instance where the at least one resource account meets the resource transmission request, the resource transmission request.

In some embodiments, the computer-readable code causes the at least one processing device to perform the following operation to receive, from a satellite associated with the satellite-based communication component, a resource transmission satellite communication acknowledgement, wherein the resource transmission satellite communication acknowledgement comprises an acknowledgement of the received resource transmission satellite communication. In some embodiments, the computer-readable code causes the at least one processing device to perform the following operations: generate, based on the satellite-based communication transmission volume, the resource transmission satellite communication, wherein, in an instance where the resource transmission request exceeds the satellite-based communication transmission volume, the resource transmission satellite communication comprises a sequence of a plurality of portions of the resource transmission request; transmit, based on the sequence of resource transmission request, the resource transmission satellite communication comprising the plurality of portions to the satellite component associated with the satellite-based communication component; and receive, from the satellite component, at least one resource transmission satellite communication acknowledgement for the resource transmission satellite communication.

In some embodiments, the computer-readable code causes the at least one processing device to perform the following operation to receive, from the resource transmission processing component, a resource transmission processing component acknowledgement, wherein the resource transmission processing component acknowledgement comprises an acknowledgement of the received resource transmission satellite communication.

In some embodiments, the resource transmission request comprises a request to receive a resource at the resource account. In some embodiments, the computer-readable code causes the at least one processing device to perform the following operations: receive a current geolocation data of the user device, wherein the current geolocation data comprises a geolocation of the user device at a time of the resource transmission request; determine, based on the geolocation of the user device, a resource type identifier; identify a received resource associated with the resource transmission request, wherein the received resource comprises a received resource type identifier; and determine whether to convert a received resource type of the received resource, wherein, in an instance where the received resource type identifier matches the resource type identifier, do not convert the resource type of the received resource type to a resource type of the resource type identifier, or wherein, in an instance where the received resource type identifier does not match the resource type identifier, convert the resource type of the received resource type to a resource type of the resource type identifier.

In some embodiments, the computer-readable code causes the at least one processing device to perform the following operations: identify a resource shipping object, wherein the resource shipping object comprises a physical resource associated with the resource transmission request and at least one satellite-based communication component; receive a current geolocation data of the resource shipping object, wherein the current geolocation data is based on the at least one satellite-based communication component; determine an intended recipient geolocation data of the resource transmission request; compare the current geolocation data and the intended recipient geolocation data; and automatically, in an instance where the current geolocation data and the intended recipient geolocation matches at a first time, allow the resource transmission request. In some embodiments, the computer-readable code causes the at least one processing device to perform the following operation to identify the current geolocation data of the resource shipping object, wherein the current geolocation data is based on at least one satellite-image of the resource shipping object. In some embodiments, the current geolocation data of the resource shipping object is received at pre-determined periodic periods. In some embodiments, the current geolocation data of the resource shipping object is identified at pre-determined periodic periods.

In some embodiments, the user device is configured with a resource processing computing application.

In some embodiments, the user device is a resource processing device.

In some embodiments, the resource transmission request comprises at least one of a request to transmit a resource from the resource account or a request to receive a resource at the resource account.

In another aspect, a computer program product for generating resource transmissions using satellite-based communications is provided. In some embodiments, the computer program product comprises at least one non-transitory computer-readable medium having computer-readable program code portions embodied therein, the computer-readable program code portions which when executed by a processing device are configured to cause the processor to perform the following operations: identify a user device, wherein the user device comprises a satellite-based communication component; generate, by the user device, a resource transmission request, wherein the resource transmission request is associated with at least one resource account; determine, based on the satellite-based communication component, a satellite-based communication transmission volume; generate, based on the satellite-based communication transmission volume, a resource transmission satellite communication, wherein the resource transmission satellite communication comprises at least a portion of the resource transmission request; transmit, via a satellite component, the resource transmission satellite communication to a resource transmission processing component; and allow, in an instance where the at least one resource account meets the resource transmission request, the resource transmission request.

In some embodiments, the resource transmission request comprises a request to receive a resource at the resource account. In some embodiments, the processing device is further configured to cause the processor to perform the following operations: receive a current geolocation data of the user device, wherein the current geolocation data comprises a geolocation of the user device at a time of the resource transmission request; determine, based on the geolocation of the user device, a resource type identifier; identify a received resource associated with the resource transmission request, wherein the received resource comprises a received resource type identifier; and determine whether to convert a received resource type of the received resource, wherein, in an instance where the received resource type identifier matches the resource type identifier, do not convert the resource type of the received resource type to a resource type of the resource type identifier, or wherein, in an instance where the received resource type identifier does not match the resource type identifier, convert the resource type of the received resource type to a resource type of the resource type identifier.

In some embodiments, the processing device is further configured to cause the processor to perform the following operations: identify a resource shipping object, wherein the resource shipping object comprises a physical resource associated with the resource transmission request and at least one satellite-based communication component; receive a current geolocation data of the resource shipping object, wherein the current geolocation data is based on the at least one satellite-based communication component; determine an intended recipient geolocation data of the resource transmission request; compare the current geolocation data and the intended recipient geolocation data; and automatically, in an instance where the current geolocation data and the intended recipient geolocation matches at a first time, allow the resource transmission request.

In another aspect, a computer-implemented method for generating resource transmissions using satellite-based communications is provided. In some embodiments, the computer-implemented method comprises: identifying a user device, wherein the user device comprises a satellite-based communication component; generating, by the user device, a resource transmission request, wherein the resource transmission request is associated with at least one resource account; determining, based on the satellite-based communication component, a satellite-based communication transmission volume; generating, based on the satellite-based communication transmission volume, a resource transmission satellite communication, wherein the resource transmission satellite communication comprises at least a portion of the resource transmission request; transmitting, via a satellite component, the resource transmission satellite communication to a resource transmission processing component; and allowing, in an instance where the at least one resource account meets the resource transmission request, the resource transmission request.

In some embodiments, the resource transmission request comprises a request to receive a resource at the resource account. In some embodiments, the computer-implemented method may further comprise: receiving a current geolocation data of the user device, wherein the current geolocation data comprises a geolocation of the user device at a time of the resource transmission request; determining, based on the geolocation of the user device, a resource type identifier; identifying a received resource associated with the resource transmission request, wherein the received resource comprises a received resource type identifier; and determining whether to convert a received resource type of the received resource, wherein, in an instance where the received resource type identifier matches the resource type identifier, not converting the resource type of the received resource type to a resource type of the resource type identifier, or wherein, in an instance where the received resource type identifier does not match the resource type identifier, converting the resource type of the received resource type to a resource type of the resource type identifier.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
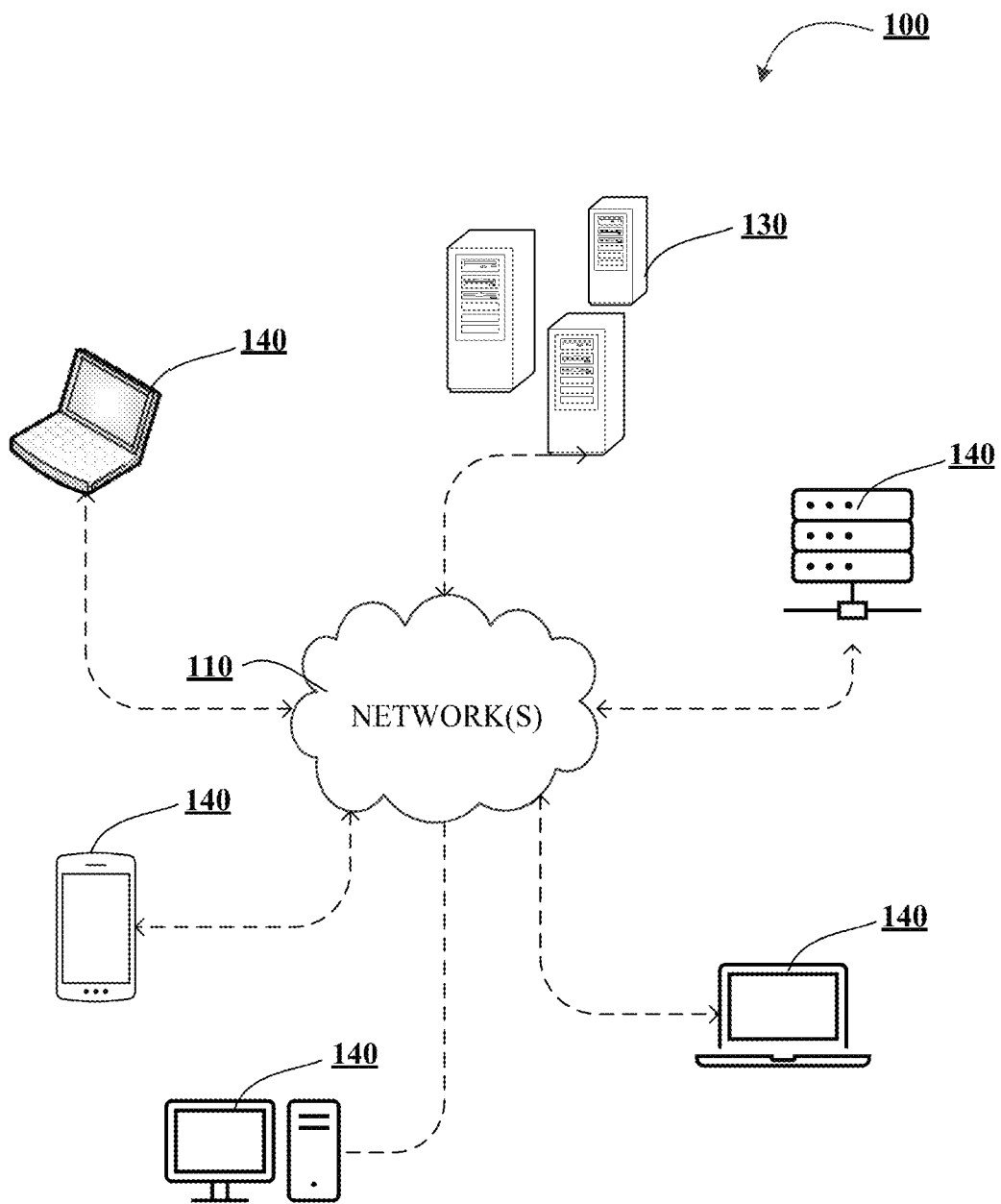
Figure 1B:
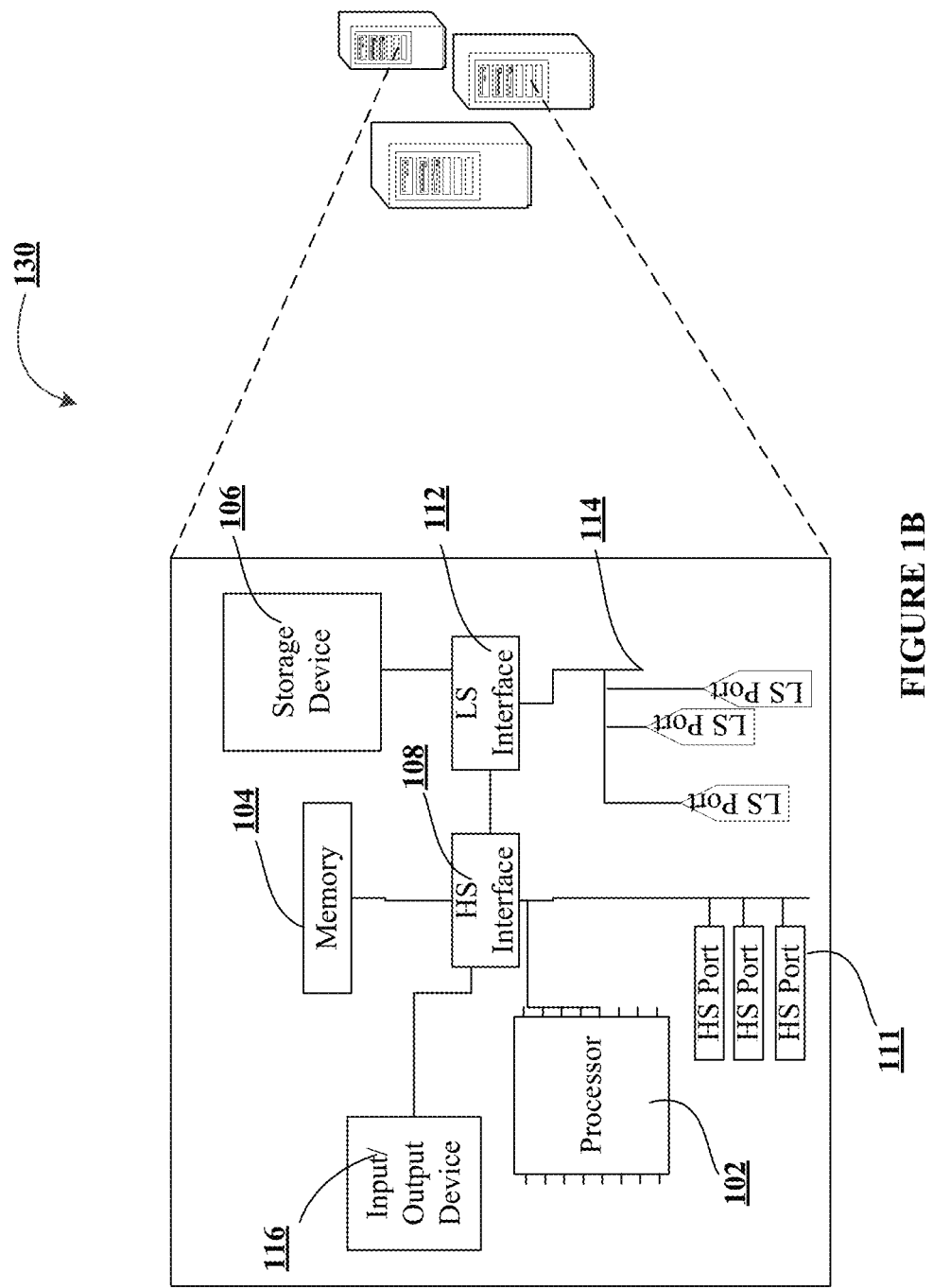
Figure 1C:
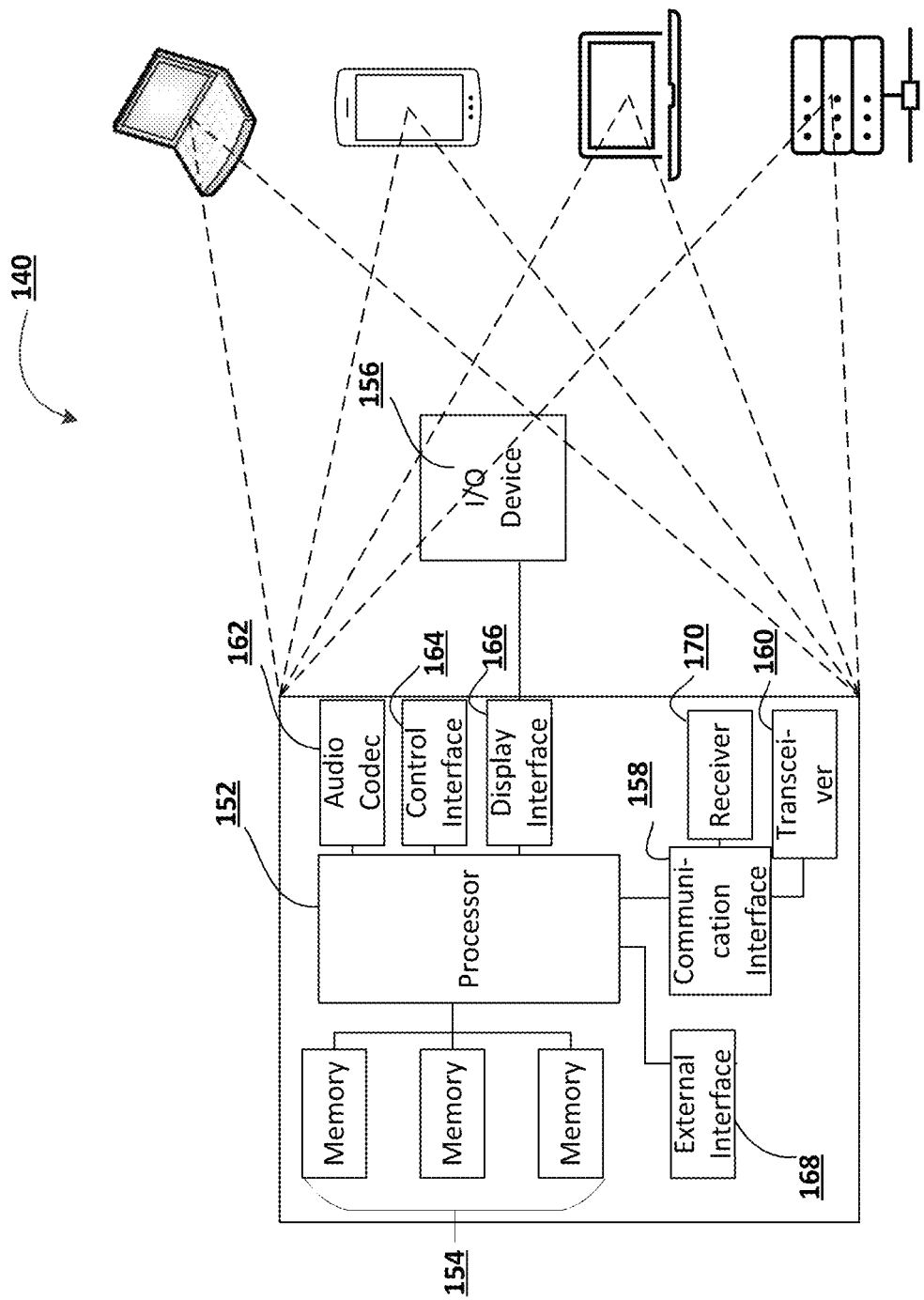
Figure 2:
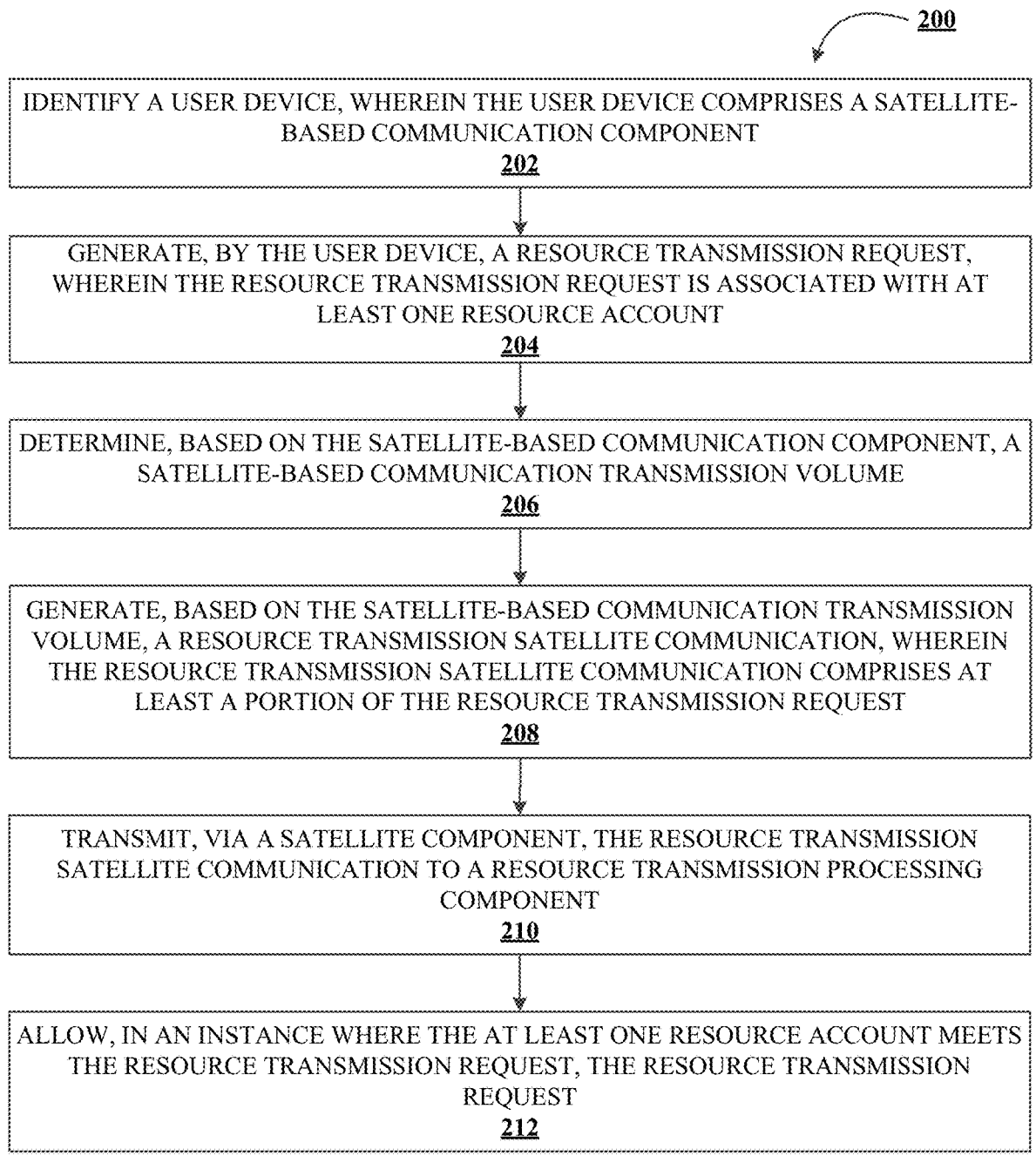
Figure 3A:
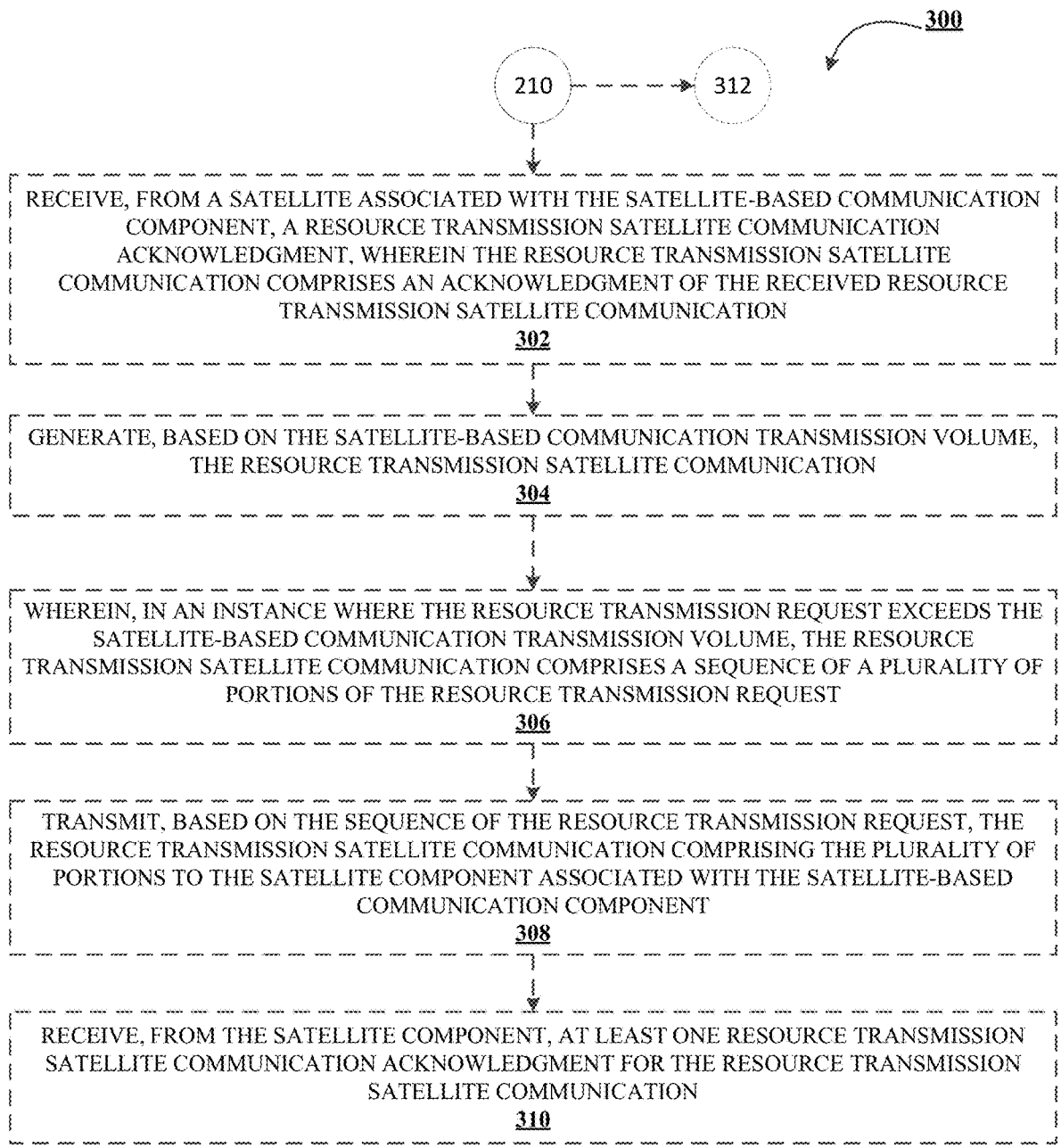
Figure 3B:
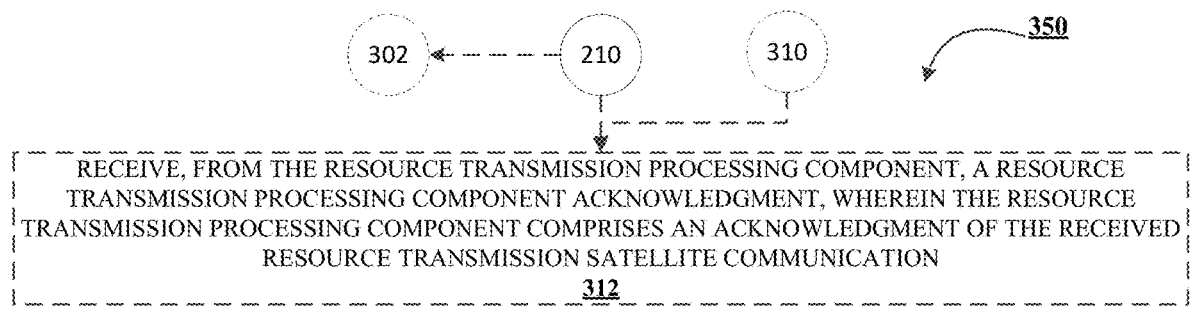
Figure 4:
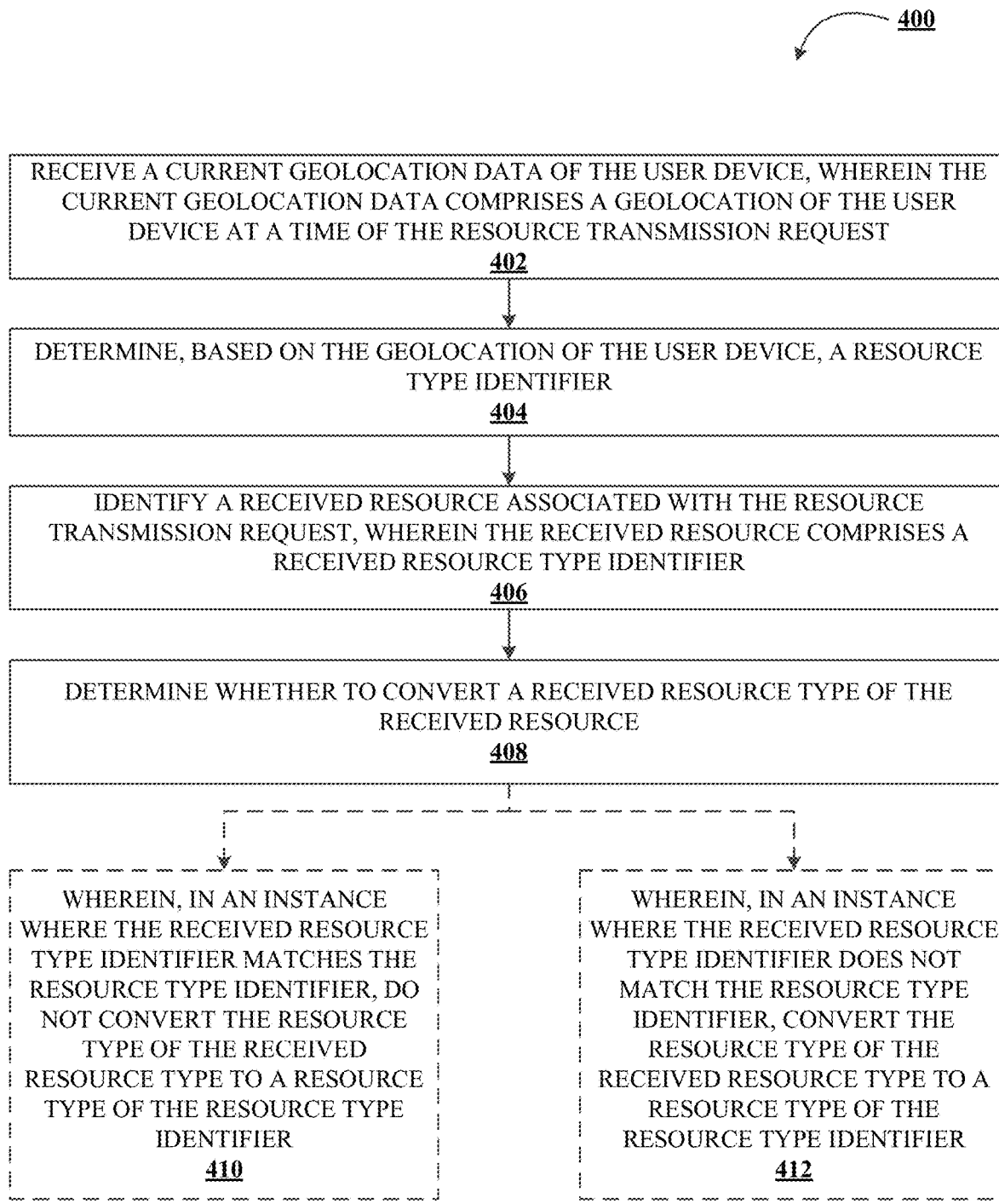
Figure 5:
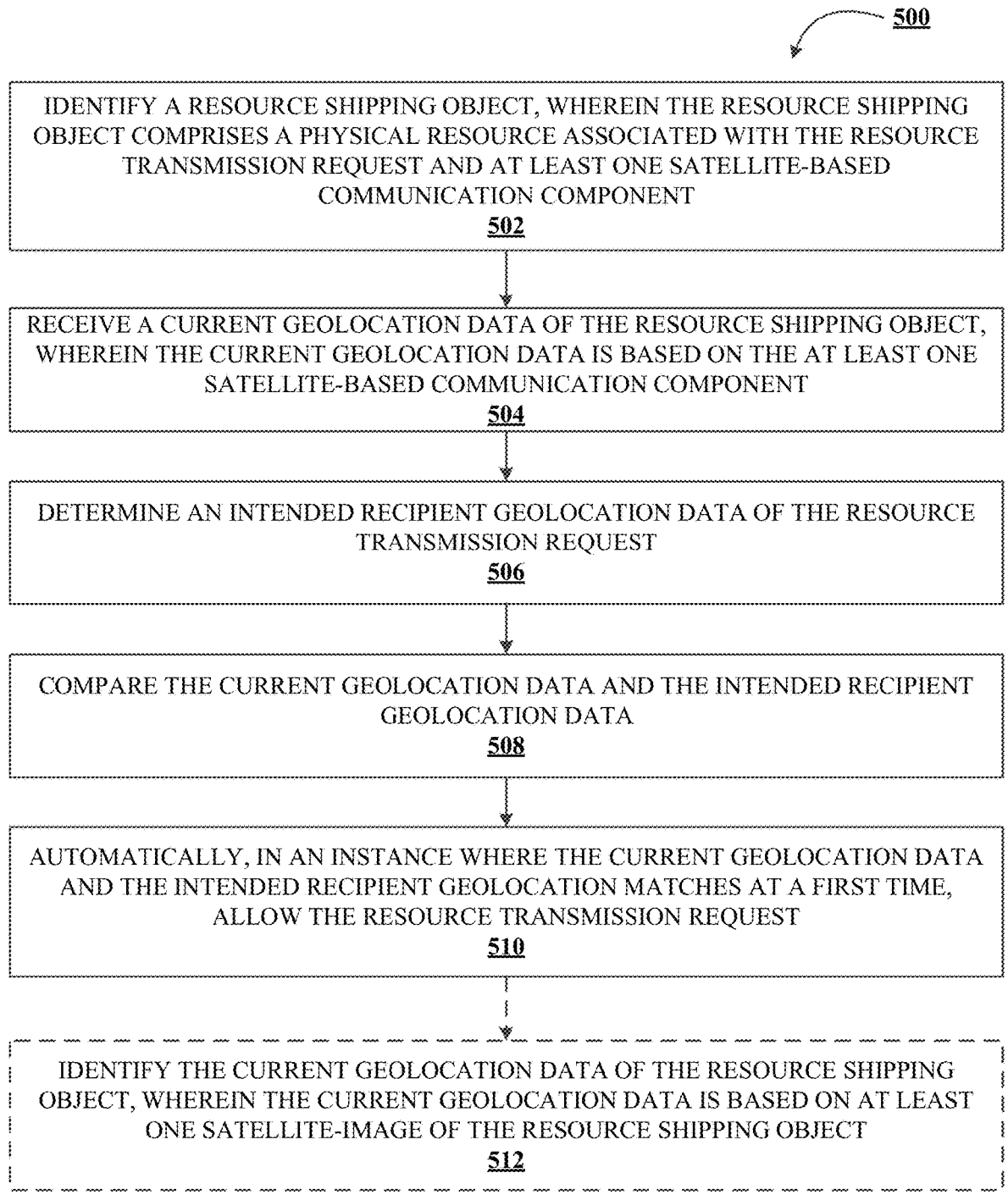

Having thus described embodiments of the invention in general terms, reference will now be made the accompanying drawings, wherein:

FIGS. 1A-1C illustrates technical components of an exemplary distributed computing environment for generating resource transmissions using satellite-based communications, in accordance with an embodiment of the invention;

FIG. 2 illustrates a process flow for generating resource transmissions using satellite-based communications, in accordance with an embodiment of the invention;

FIGS. 3A-3B illustrate a process flow generating resource transmission satellite communication(s) and receiving acknowledgement(s), in accordance with an embodiment of the invention;

FIG. 4 illustrates a process flow for determining whether to convert a received resource type based on geolocation data, in accordance with an embodiment of the invention; and FIG. 5 illustrates a process flow for automatically allowing the resource transmission request based on geolocation data, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where any possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device (i.e., a user device) that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," "resource allocation," or "resource transmission" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As mentioned above, users of electronic networks, especially wireless and cellular networks, may have a harder time than ever transmitting messages, accessing online applications, and transmitting electronic resources when electronic networks are unavailable or down. For instance, and in certain geographic locations, electronic networks may be difficult to access or use for users and their devices. Further, and still, the problem is exacerbated where such a lack of electronic network availability leads to an inability to use particular applications, such as for resource transmissions. Thus, there exists a need for a system to accurately, efficiently, and securely transmit resource transmission and resource transmission requests when cellular and wireless networks are unavailable. For instance, and in some embodiments, the system may need to be configured to transmit resource transmission requests to a remote processing center(s), despite there being no electronic networks available.

Accordingly, the satellite-based resource transmission system acts by identifying a user device, wherein the user device comprises a satellite-based communication component; generating, by the user device, a resource transmission request, wherein the resource transmission request is associated with at least one resource account; determining, based on the satellite-based communication component, a satellite-based communication transmission volume (e.g., a maximum volume of data that may be transmitted at a time via satellite); generating, based on the satellite-based communication transmission volume, a resource transmission satellite communication, wherein the resource transmission satellite communication comprises at least a portion of the resource transmission request (e.g., based on the maximum volume of data); transmitting, via a satellite component, the resource transmission satellite communication to a resource transmission processing component; and allowing, in an instance where the at least one resource account meets the resource transmission request, the resource transmission request (e.g., whereby the transmission processing component may determine whether the resource transmission of the resource transmission request exceeds the resource account).

In some embodiments, the satellite-based resource transmission system may further track physical resources as they are moved and/or shipped across geographic regions. Further, the satellite-based resource transmission system may automatically transmit electronic resources upon execution of the physical resource when it reaches certain geolocations, where such geolocations may be difficult to track without electronic network coverage. For instance, and in some embodiments, the satellite-based resource transmission system may track—by satellite communication components attached and/or associated with a physical resource—the physical resource's location (in real-time and/or near real-time) and automatically release and/or transmit electronic resources when the physical resource reaches a pre-determined location.

What is more, the present invention provides a technical solution to a technical problem. As described herein, the technical problem includes the transmission of electronic resource requests, the tracking of physical resources, and the automatic transmissions of electronic resources when electronic networks, such as wireless and cellular networks, are unavailable (i.e., at any location and at any time). The technical solution presented herein allows for the satellite-based resource transmission system to accurately, efficiently, and securely transmit resource transmission(s) and resource transmission request(s) when cellular and wireless networks are unavailable, in real-time In particular, the satellite-based resource transmission system is an improvement over existing solutions to the transmission of electronic resources at any location and/or at any time, (i) with fewer steps to achieve the solution, thus reducing the amount of computing resources, such as processing resources, storage resources, network resources, and/or the like, that are being used (e.g., by determining the satellite-based communication transmission volume and generating the resource transmission satellite communication to not exceed the maximum volume, the satellite-based resource transmission system allows for the lowest number of data transmission required to transmit the entire resource transmission satellite communication via satellite), (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources (e.g., by using satellite communication components within the user device(s), the user device(s) may be retrofitted without needed to change the infrastructure of the devices, the processing center(s), and/or the satellite(s)). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating resource transmissions using satellite-based communications 100, in accordance with an embodiment of the invention. As shown in FIG. 1A, the distributed computing environment 100 contemplated herein may include a system 130 (i.e., a satellite-based resource transmission system), an end-point device(s) 140, and a network(s) 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may comprise a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, or any combination of the foregoing. The network(s) 110 may be secure and/or unsecure and may also include wireless and/or wired and/or optical interconnection technology. The network(s) 110 may comprise a satellite network configured to receive and/or receive satellite communications.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, a point of sale device, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary and/or satellite network communication capabilities, such as through the use and implementation of satellite communication component(s). Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for [ ], in accordance with an embodiment of the disclosure. In some embodiments, a system (e.g., similar to one or more of the systems described herein with respect to FIGS. 1A-1C and 2) may perform one or more of the steps of process flow 200. For example, a satellite-based resource transmission system (e.g., the system 130 described herein with respect to FIG. 1A-1C) may perform the steps of process 200.

As shown in block 202, the process flow 200 may include the step of identifying a user device, wherein the user device comprises a satellite-based communication component. In some embodiments, the satellite-based resource transmission system may identify a user device based on its communication with the user device (e.g., over a network and/or over satellite communication), based on its wired communication (e.g., wherein the satellite-based resource transmission system may be configured to be downloaded and/or embedded in the user device), and/or the like. In either circumstance, the satellite-based resource transmission system may identify the user device as comprising the satellite-based communication component which may be used to transmit messages (e.g., a resource transmission request and/or portions of a resource transmission request) via at least one satellite to a remote processing center (e.g., a resource transmission processing component, which is described in further detail herein). Based on this user device communication via at least one satellite, the satellite-based resource transmission system may identify the user device based on the transmission(s) and identify the user associated with the user device, the user device itself (e.g., based on IP address, IMEI number, serial number, and/or the like), a user account associated with the user device, a resource account associated with the user account, and/or the like.

In some embodiments, a user device may refer to a device associated with a user, whereby the user may intend to transmit a resource transmission request for a resource transmission to a processing center (e.g., a resource transmission processing component). Such a user device may comprise at least one of a computing device (e.g., a desktop, a laptop, a tablet, and/or the like), a mobile device, a resource processing device (e.g., a point of sale device at a merchant location), and/or the like. In some embodiments, the user device may be configured with a resource processing computing application which may be downloaded and used on the user device, whereby the resource processing computing application may request authentication credentials from the user in order to identify a user account and associated resource account(s) from which a resource may be associated with. For instance, the resource processing computing application may configure the graphical user interface (GUI) of the user device to request authentication credentials from the user, details regarding a potential resource transmission (e.g., a recipient identifier of the resource transmission, a time for the resource transmission, an amount for the resource transmission, and/or the like), and other such information required before transmitting the resource transmission to the intended recipient associated with the recipient identifier.

In some embodiments, the user device may first be configured to determine whether the user device has access to a cellular network (where the user device is a mobile device), an internet connection (or Wi-Fi connection), and/or the like, before using the satellite-based communication component for transmitting the resource transmission request via satellite.

As used herein, the satellite-based communication component may comprise a satellite-enabled device and/or satellite-enabling communication chip, whereby the satellite-enabling communication chip may be embedded in the hardware of the user device and its capabilities may be accessed by the user device. In some embodiments, the satellite-based communication component may allow lower bandwidth communication transmissions via satellite between the user device associated with the satellite-based communication component and a secondary device, such as a processing center (e.g., resource transmission processing component) and/or a secondary user device. Such lower bandwidth communication may allow for communication by the user device where other forms of communication (e.g., internet/network communications, cellular communications via cellular towers, and/or the like) may be unavailable or may be too slow (e.g., may only allow 1G communication). In contrast, and in some embodiments, by configuring the user device with the satellite-based communication component, the user device may communicate via satellite through the use of 2G and/or 3G communications.

As shown in block 204, the process flow 200 may include the step of generating—by the user device—a resource transmission request, wherein the resource transmission request is associated with at least one resource account. In some embodiments, the satellite-based resource transmission system may generate, via the user device, a resource transmission request, whereby the resource transmission request comprises at least the identification of a resource account from which to pull the resource from (e.g., where the user of the user device is transmitting the resource to a recipient) and/or an identification of a resource account to place the resource of the resource transmission request (e.g., where the user of the user device is the recipient of the resource transmission request). In some embodiments, and where the user of the user device is intending to transmit a resource to a recipient, the satellite-based resource transmission system may generate, by the user interacting with the user device, a resource transmission request comprising an identification of a resource account for the resource transmission, an amount of a resource, a recipient identifier for the intended recipient, a time for the resource transmission, and/or the like.

In some embodiments, the recipient identifier may automatically be generated based on a geolocation tracking of the user device (e.g., where the user device is at a merchant location, the satellite-based resource transmission system may identify the recipient as the merchant).

As shown in block 206, the process flow 200 may include the step of determining—based on the satellite-based communication component—a satellite-based communication transmission volume. As used herein, the satellite-based communication transmission volume may refer to a maximum data transmission volume (e.g., megabytes, gigabytes, bytes, and/or the like) which may be transmitted—at a single time—by the satellite-based communication component and satellite. In some embodiments, the satellite-based resource transmission system may determine this satellite-based communication transmission volume based on the satellite-based communication component's capabilities, based on the satellite associated with the satellite-based communication component (i.e., the satellite chosen by the satellite-based communication component for the resource transmission), and/or the like.

As shown in block 208, the process flow 200 may include the step of generating—based on the satellite-based communication transmission volume—a resource transmission satellite communication, wherein the resource transmission satellite communication comprises at least a portion of the resource transmission request. As used herein, the resource transmission satellite communication may comprise the data of the resource transmission request in a transmittable format, such that the resource transmission satellite communication can be transmitted from the user device to a secondary device, via a satellite.

By way of non-limiting example, the satellite-based resource transmission system may determine that the satellite-based communication transmission volume is less than the volume of the resource transmission satellite communication, the satellite-based resource transmission system may chunk the resource transmission satellite communication into a sequence of resource transmission satellite communications. Such a chunking to generate a sequence of resource transmission satellite communications may chunk each portion of the resource transmission satellite communication, such that each portion of the sequence of resource transmission satellite communications comprises a first portion, and at least a second portion, and/or the like, such that each portion is used to make the entire resource transmission satellite communication in the original order.

By way of non-limiting example, the satellite-based resource transmission system may determine that the satellite-based communication transmission volume is greater than or equal to the volume of the resource transmission satellite communication. Thus, and by way of non-limiting example, the satellite-based resource transmission system may use the originally generated resource transmission satellite communication and transmit the resource transmission satellite communication, via the satellite, to the secondary user device and/or the processing center (e.g., the resource transmission processing component).

As shown in block 210, the process flow 200 may include the step of transmitting—via a satellite component—the resource transmission satellite communication to a resource transmission processing component. By way of non-limiting example, the satellite-based resource transmission system may transmit the resource transmission satellite communication from the user device to a resource transmission processing component, whereby the resource transmission processing component may be configured to process the resource transmission request and generate the resource transmission from the resource account of the sender to the recipient resource account. In some embodiments, the resource transmission processing component may refer to a processing center for resource transmissions, such as a financial institution's processing center, and/or a component within the processing center which is configured to generate the resource transmission within the processing center.

As shown in block 212, the process flow 200 may include the step of allowing, in an instance where the at least one resource account meets the resource transmission request, the resource transmission request. By way of non-limiting example, the satellite-based resource transmission system may determine whether to allow the resource transmission (i.e., the resource transmission request) based on a determination that the sender resource account identified in the resource transmission request has an equal to and/or greater amount than the resource transmission request amount. In the embodiment where the sender resource account identified in the resource transmission request has an equal to and/or greater amount than the resource transmission request amount, the satellite-based resource transmission system may allow the resource transmission request and transmit and/or transfer the resource from the sender resource account to the recipient resource account.

In some embodiments and where the sender resource account identified in the resource transmission request has a lesser amount than the resource transmission request amount, then the satellite-based resource transmission system may disallow the resource transmission request and may not transmit and/or not transfer the resource from the sender resource account to the recipient resource account.

In some embodiments, and where the user device does not initially generate the resource transmission request, but instead is coupled (e.g., via Bluetooth technology, and/or the like) to a secondary device that generated the resource transmission request, then the satellite-based resource transmission system may determine the secondary device does not comprise satellite communication capabilities and may use the user device comprising the satellite communication component to transmit the resource transmission request to the processing center. For instance, and where the secondary device is a point of sale terminal which may scan and/or read a payment instrument, then the point of sale terminal may transmit the data of the payment instrument and the resource transmission request to the user device that can communicate with the processing center via satellite. In some embodiments, and where the point of sale terminal cannot complete the resource transmission request itself, then the satellite-based resource transmission system may be used to generate a good-faith resource transmission based on the sender resource account's availability (e.g., such as a payment instrument limit), until the resource transmission request can be completed by the user device associated with the point of sale terminal.

FIGS. 3A-3B illustrate a process flow 300 and 350 for generating resource transmission satellite communication(s) and receiving acknowledgement(s), in accordance with an embodiment of the disclosure. In some embodiments, a system (e.g., similar to one or more of the systems described herein with respect to FIGS. 1A-1C and 2) may perform one or more of the steps of process flows 300 and 350. For example, a satellite-based resource transmission system (e.g., the system 130 described herein with respect to FIG. 1A-1C) may perform the steps of processes 300 and 350.

In some embodiments, and as shown in block 302, the process flow 300 may include the step of receiving—from a satellite associated with the satellite-based communication component—a resource transmission satellite communication acknowledgement, wherein the resource transmission satellite communication comprises an acknowledgement of the received resource transmission satellite communication. In some embodiments, the process described herein may follow the process described with respect to block 210 of FIG. 2. In some embodiments, the satellite-based resource transmission system may choose between the process flow 300 or the process flow 350 in receiving acknowledgements of the resource transmission satellite communication. In some embodiments, the satellite-based resource transmission system may use both the processes described in process flow 300 and process flow 350 in receiving acknowledgements of the resource transmission satellite communication.

In some embodiments, the satellite-based resource transmission system may receive a resource transmission satellite communication acknowledgement, whereby the satellite which is used to transmit the resource transmission satellite communication to the processing center (i.e., the resource transmission processing component) may send an acknowledgement back to the user device letting the user device know that the resource transmission satellite communication has been received by the satellite and transmitted to the processing center.

In some embodiments, and as shown in block 304, the process flow 300 may include the step of generating, based on the satellite-based communication transmission volume, the resource transmission satellite communication. In some embodiments, the original resource transmission satellite communication may be transmitted to the processing center via the satellite when the resource transmission satellite communication has a value equal to or less than the resource transmission satellite communication.

In some embodiments, and as shown in block 306, the process flow 300 may include, in an instance where the resource transmission request exceeds the satellite-based communication transmission volume, the resource transmission satellite communication comprises a sequence of a plurality of portions of the resource transmission request. By way of non-limiting example, the satellite-based resource transmission system may determine that a sequence of resource transmission satellite communications must be transmitted to the processing center when the original resource transmission satellite communication is greater in volume than the satellite-based communication transmission volume.

In some embodiments, and as shown in block 308, the process flow 300 may include the step of transmitting—based on the sequence of the resource transmission request—the resource transmission satellite communication comprising the plurality of portions to the satellite component associated with the satellite-based communication component. In some embodiments, the satellite-based resource transmission system may transmit the resource transmission satellite communication comprising at least one of the resource transmission satellite communication as a single transmission and/or the resource transmission satellite communication comprising chunks of the resource transmission satellite communication as a plurality of portions and in a sequence based on the original resource transmission satellite communication. Thus, and in some embodiments where the resource transmission satellite communication comprises a plurality of portions and the plurality of portions are transmitted via satellite as a plurality of resource transmission satellite communications, each comprising a portion of the plurality of portions, the satellite-based resource transmission system may determine a sequence to transmit each portion based on the original resource transmission satellite communication, such that each portion is transmitted sequentially as it would've been read in the original resource transmission satellite communication.

In some embodiments, and as shown in block 310, the process flow 300 may include the step of receiving, from the satellite component, at least one resource transmission satellite communication acknowledgement for the resource transmission satellite communication. By way of non-limiting example, the satellite-based resource transmission system may receive—from the satellite once at least a portion of the resource transmission satellite communication has been transmitted—an acknowledgement of the resource transmission satellite communication. As used herein, the resource transmission satellite communication acknowledgement may comprise a data packet comprising information of the resource transmission satellite communication (e.g., the portion of the resource transmission satellite communication) as it is received and may be transmitted to the satellite-based resource transmission system as a confirmation that the resource transmission satellite communication was received.

In some embodiments, the satellite-based resource transmission system may be stored and/or used by the user device that generated the resource transmission request (as described in further detail above). In some embodiments, the satellite-based resource transmission system may be stored and/or used by the satellite that received and/or transmitted the resource transmission satellite communication. In some embodiments, the satellite-based resource transmission system may be stored and/or used by the processing center (e.g., the resource transmission processing component) and/or a secondary user device, where the resource transmission satellite communication is received and/or processed. Similar, and in some embodiments, the satellite-based resource transmission system may be stored as a distributed satellite-based resource transmission system across all and/or a portion of these devices (i.e., the user device, the satellite, the processing center, and/or the like), such that the satellite-based resource transmission system may communicate and/or update itself in real time.

In some embodiments, the resource transmission satellite communication acknowledgement may comprise data such as a time of receipt by the satellite, data regarding which portion (e.g., a sequential identifier of the portion of the resource transmission satellite communication received, such as a first portion, a second portion, a third portion, and/or the like), data regarding the number of intended portions that will be received (e.g., a number of total portions for the resource transmission satellite communication that should be received by the satellite), an identifier of where the resource satellite communication will be transmitted to (e.g., the processing center), and/or the like.

In some embodiments, the satellite may be configured to transmit each of the portions of the resource transmission satellite communication once each of the portions of the resource transmission satellite communication have been received by the satellite. For instance, the satellite may only transmit the resource transmission satellite communication once all of the portions have been received by the satellite. In some embodiments, the satellite may be configured to transmit each of the portions of the resource transmission satellite communication upon receipt of each portion of the resource transmission satellite communication. For instance, the satellite may be configured to transmit each portion of the resource transmission satellite communication immediately upon receipt of each portion. In some embodiments, the immediate transmission may only occur after a resource transmission satellite communication acknowledgement for the portion has been transmitted to the satellite-based resource transmission system.

In some embodiments, and as shown in block 312, the process flow 350 may include the step of receiving—from the resource transmission processing component—a resource transmission processing component acknowledgement, wherein the resource transmission processing component comprises an acknowledgement of the received resource transmission satellite communication. In some embodiments, the processes described herein with respect to process flow 350 may occur in sequence after at least one of the processes described with respect to block 210 of FIG. 2 (i.e., after the satellite component transmits the resource transmission satellite communication to the resource transmission processing component), after the processes described with respect to block 310 (i.e., after the satellite-based resource transmission system has received the at least one resource transmission communication acknowledgment from the satellite component), and/or the like. In some embodiments, the processes described herein with respect to process flow 350 may occur in place of the processes described with respect to process flow 300 (e.g., in place of the processes described with respect to blocks 302-310).

By way of non-limiting example, the satellite-based resource transmission system may receive—from the processing center (e.g., the resource transmission processing component)—a resource transmission processing component acknowledgement, whereby the resource transmission processing component acknowledgment may be transmitted to the satellite-based resource transmission system to confirm the receipt of the resource transmission satellite communication at the processing center. In some embodiments, and where the resource transmission satellite communication comprises a plurality of portions of the resource transmission satellite communication, the satellite-based resource transmission system may receive—from the processing center—a plurality of resource transmission processing component acknowledgements, whereby each of the plurality of resource transmission processing component acknowledgements is associated with a portion of the resource transmission satellite communication.

Similar to the processes described above with respect to blocks 302-310, the satellite-based resource transmission system may include the step of generating, based on the satellite-based communication transmission volume, the resource transmission satellite communication. For instance, the satellite-based resource transmission system may generate the satellite-based communication transmission volume based on the satellite component, the user device used to generate the resource transmission request, the processing center, and/or the like, whereby the satellite-based communication transmission volume is used to determine the maximum amount of data that may be transmitted to the processing center—via satellite—at a single time. In some embodiments, and where the resource transmission exceeds the satellite-based communication transmission volume, the processing center—via the satellite component, may receive a plurality of portions of the resource transmission satellite communication and may generate a plurality of resource transmission satellite communication acknowledgements.

However, and in the embodiments where the resource transmission request does not exceed the satellite-based communication transmission volume, the satellite-based resource transmission system may receive only one resource transmission satellite communication acknowledgment from the processing center once the processing center has received—via the satellite—the resource transmission satellite communication.

FIG. 4 illustrates a process flow 400 for determining whether to convert a received resource type based on geolocation data, in accordance with an embodiment of the disclosure. In some embodiments, a system (e.g., similar to one or more of the systems described herein with respect to FIGS. 1A-1C and 2) may perform one or more of the steps of process flow 400. For example, a satellite-based resource transmission system (e.g., the system 130 described herein with respect to FIG. 1A-1C) may perform the steps of process 400.

As shown in block 402, the process flow 400 may include the step of receiving a current geolocation data of the user device, wherein the current geolocation data comprises a geolocation of the user device at a time of the resource transmission request. By way of non-limiting example, the satellite-based resource transmission system may receive a current geolocation data of the user device that generated the resource transmission request, at the time the resource transmission request was generated. In some embodiments, the resource transmission request may comprise a request to receive a resource at the resource account, where the resource account may be associated with the current geolocation data of the resource transmission request. In such embodiments, the satellite-based resource transmission system may be configured to change and/or convert the resource of the resource transmission request from a first type of resource (e.g., where the resource comprises a monetary value of a particular type, such as a currency, before the resource transmission request) to a secondary type of resource (e.g., where the geolocation of the resource transmission request is associated with a secondary resource type, such as a different currency), then the satellite-based resource transmission system may convert the resource of the resource transmission request to the secondary resource type.

As shown in block 404, the process flow 400 may include the step of determining, based on the geolocation of the user device, a resource type identifier. By way of non-limiting example, the satellite-based resource transmission system may determine—based on the geolocation data of the user device at the time the resource transmission request is generated—a resource type identifier of that the resource of resource transmission request should comprise. For instance, and where the resource transmission request comprises a request for a resource to be transmitted to the user account of the user device, the satellite-based resource transmission system may determine the resource of the resource transmission request should comprise a particular resource type based on the country, city, and/or the like, that the user device is currently located in.

However, and in some embodiments where the resource transmission request comprises a resource being transmitted from the resource account associated with the user of the user device to a recipient resource account, the satellite-based resource transmission system may determine the current resource type identifier based on the current geolocation data of the user device and based on a current geolocation data of a recipient device associated with the recipient resource account.

As shown in block 406, the process flow 400 may include the step of identify a received resource associated with the resource transmission request, wherein the received resource comprises a received resource type identifier. In some embodiments, the satellite-based resource transmission system may identify whether a received resource associated with the resource transmission request (e.g., the received resource for the user associated with the user device and/or the received resource associated with a recipient resource account of a recipient user) has been received, and whether the received resource comprises a received resource type identifier (e.g., a currency type of the resource based on where it was transmitted from, such as an original currency type of the resource).

As shown in block 408, the process flow 400 may include the step of determining whether to convert a received resource type of the received resource. By way of non-limiting example, the satellite-based resource transmission system may determine whether to convert the received resource type of the resource based on at least one of the current geolocation data and associated resource type identifier and/or the current geolocation data of the recipient device associated with a recipient user (e.g., where the user device generated the resource transmission request to transmit a resource to a recipient resource account).

In some embodiments, and as shown in block 410, the process flow 400 may include the step of not converting—in an instance where the received resource type identifier matches the resource type identifier—the resource type of the received resource type to a resource type of the resource type identifier. In some embodiments, and where the received resource type identifier matches the resource type identifier associated with the user device (and/or recipient device), the satellite-based resource transmission system may not have to convert the resource type of the received resource to the resource type of the user device (and/or recipient device). In this manner, the satellite-based resource transmission system may streamline the received resource which may be used by the user of the user device, regardless of where the received resource was transmitted from and where the received resource was received. Thus, the received resource may be used at any geolocation, based on the resource type identifier of the geolocation for the user device (and/or recipient user device).

In some embodiments, and as shown in block 412, the process flow 400 may include the step of converting—in an instance where the received resource type identifier does not match the resource type identifier—converting the resource type of the received resource type of the received resource type to a resource type of the resource type identifier. By way of non-limiting example, the satellite-based resource transmission system may convert the received resource type identifier to a resource type identifier of the user device (and/or recipient user device), when the received resource type identifier does not match the resource type identifier of the user device. Thus, and in some embodiments, the satellite-based resource transmission system may be configured to determine the resource type identifier of the user device (and/or recipient user device) and whether the received resource comprises the same resource type identifier. In the embodiments, where the satellite-based resource transmission system does convert the received resource type identifier to the resource type identifier, the satellite-based resource transmission system may determine a conversion rule for the received resource and apply the conversion rule to the received resource to generate the received resource comprising the resource type identifier of the user device.

In some embodiments, the resource transmission request may comprise a request to receive a resource at the resource account. In some embodiments, the resource transmission request may comprise a request for the received resource to automatically be input to the resource account once the resource has been received. In this manner, the satellite-based resource transmission system may automatically update the resource account(s) when the resource is transmitted and/or received, whereby the resource account(s) updated may comprise the transmitting resource account and/or the receiving resource account.

In some embodiments, the satellite-based resource transmission system may be configured to determine a resource generation based on applying a satellite-based communication component to a resource generating device, such as a solar panel, a windmill, a hydroelectric facility, and/or the like, whereby the satellite-based resource transmission system may track the energy (or resource) generated at the geolocation of the resource generating device and determine a resource transmission for the owner of the resource generating device. For instance, and in some embodiments, the satellite-based resource transmission system may use the satellite-based communication component within each resource generating device, whereby the satellite-based communication component may transmit the read output of the resource generating device and transmit, in real-time to a processing center, which in turn may determine a resource value to transmit to the owner of the resource generator.

FIG. 5 illustrates a process flow 500 for automatically allowing the resource transmission request based on geolocation data, in accordance with an embodiment of the disclosure. In some embodiments, a system (e.g., similar to one or more of the systems described herein with respect to FIGS. 1A-1C and 2) may perform one or more of the steps of process flow 500. For example, a satellite-based resource transmission system (e.g., the system 130 described herein with respect to FIG. 1A-1C) may perform the steps of process 500.

As shown in block 502, the process flow 500 may include the step of identifying a resource shipping object, wherein the resource shipping object comprises a physical resource associated with the resource transmission request and at least one satellite-based communication component. By way of non-limiting example, the satellite-based resource transmission system may receive a current geolocation data of the resource shipping object based on a geolocation tracking component within the resource shipping object, the satellite communication component of the resource shipping object, satellite-imaging of the resource shipping object, and/or the like. In some embodiments, and by way of example, the resource shipping object as described herein may comprise a shipping container and/or a resource carrier, whereby the resource shipping object comprises a satellite communication component for tracking the geolocation of the resource shipping object (e.g., shipping container/resource container comprising a resource).

As shown in block 504, the process flow 500 may include the step of receiving a current geolocation data of the resource shipping object, wherein the current geolocation data is based on the at least one satellite-based communication component.

In some embodiments, the satellite-based resource transmission system may receive a current geolocation data of the resource shipping object based on at least one satellite-based communication component, whereby the satellite-based communication component may transmit data to the satellite component of the geolocation of the resource shipping object at pre-determined periodic periods, such as—but not limited to—every thirty seconds, every minute, every five minutes, every ten minutes, every fifteen minutes, every twenty minutes, every thirty minutes, every hour, and/or the like. Thus, and in some embodiments, the satellite-based resource transmission system may identify—based on the satellite-based communication component transmitting geolocation data—the current geolocation of the resource shipping object at the pre-determined periodic period(s).

In some embodiments, the current geolocation data of the resource shipping object may be based on satellite imagine by the satellite component of the resource shipping object. In some embodiments, the satellite imaging may be generated at pre-determined periodic periods and transmitted to the satellite-based resource transmission system for determination of the current geolocation data of the resource shipping object. Thus, and in some embodiments, the satellite-based resource transmission system may receive the current geolocation data of the resource shipping object at pre-determined periodic periods.

As shown in block 506, the process flow 500 may include the step of determining an intended recipient geolocation data of the resource transmission request. By way of non-limiting example, the satellite-based resource transmission system may determine an intended recipient geolocation data based on the resource transmission request, whereby the resource transmission request may comprise an indication of where a physical resource (e.g., a physical resource intended to be shipped, which may require a particular end-location before a resource transmission can be transmitted between a sender resource account and a recipient resource account) should be shipped to. In some embodiments, the resource transmission request may comprise a requirement for a physical resource associated with the resource transmission request to reach a particular geolocation (such as a recipient user's geolocation, a recipient user's address, a location identified by the recipient user, and/or the like) before a resource transmission from the sender resource account is transmitted to a recipient resource account. For instance, the recipient resource account may be associated with the recipient resource account, where the recipient resource account is associated with the sender of the physical resource and the sender of the physical resource is awaiting the resource transmission for payment of the physical resource.

In some embodiments, the satellite-based resource transmission system may receive an indication in the resource transmission request to transmit a plurality of portions of the resource transmission based on a plurality of geolocations associated with the physical resource. For instance, the resource transmission request may comprise a plurality of geolocation identifiers for the physical resource to meet (i.e., for the physical resource to be at before) an associated portion of the resource transmission can be transmitted from the sender resource account to the recipient resource account. For example, the resource transmission request may comprise a sequence of geolocations where the physical resource should meet as it moves from an origination location to the recipient's identified location, and at each of these geolocations, a portion of the resource transmission may be transmitted to the recipient resource account associated with the sender of the physical resource.

As shown in block 508, the process flow 500 may include the step of comparing the current geolocation data and the intended recipient geolocation data. In some embodiments, the satellite-based resource transmission system may compare the current geolocation data of the physical resource against the intended recipient geolocation data (e.g., the plurality of intended recipient geolocations and/or the final intended recipient geolocation) from the resource transmission request. In some embodiments, the satellite-based resource transmission system may transmit the resource transmission of the resource transmission request to the recipient resource account (e.g., the resource account associated with the sender of the physical resource) once at least one of the intended recipient geolocations has been met by the physical resource.

As shown in block 510, the process flow 500 may include the step of automatically, in an instance where the current geolocation data and the intended recipient geolocation matches at a first time, allow the resource transmission request. In some embodiments, the satellite-based resource transmission system may automatically allow the resource transmission request and/or a portion of the resource transmission request (i.e., allow the resource transmission and/or a portion of the resource transmission), when the current geolocation of the physical resource matches at least one of the intended recipient geolocations. In some embodiments, and where the intended recipient geolocation comprises only one geolocation, the satellite-based resource transmission system may transmit the entire resource transmission when the physical resource's geolocation matches the intended recipient geolocation. In some embodiments, and where the intended recipient geolocation comprises a plurality of intended recipient geolocation, the satellite-based resource transmission system may only transmit a plurality of portions of the resource transmission, whereby each portion is transmitted automatically once the physical resource's geolocation matches at least one intended recipient location of the plurality of intended recipient locations.

In some embodiments, and as shown in block 512, the process flow 500 may include the step of identifying the current geolocation data of the resource shipping object, wherein the current geolocation data is based on at least one satellite-image of the resource shipping object. In some embodiments, the satellite-based resource transmission system may determine the current geolocation of the physical resource based on at least one received satellite-image of the resource shipping object carrying the physical resource. For instance, the satellite-based resource transmission system may receive at least one satellite-image of the resource shipping object, which may further comprise data such as longitude and latitude of the where the satellite-image was taken, and the satellite-based resource transmission system may identify the current geolocation of the resource shipping object. Further, and as described in detail above, such a current geolocation data based on the at least one satellite-image may be used by the satellite-based resource transmission system to determine whether the resource shipping object (and the physical resource) has met the at least one intended recipient geolocation.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating resource transmissions using satellite-based communications, the system comprising:
   a memory device with computer-readable program code stored thereon;
   at least one processing device operatively coupled to the at least one memory device and the at least one communication device, wherein executing the computer-readable code is configured to cause the at least one processing device to perform the following operations:
      identify a user device, wherein the user device comprises a satellite-based communication component;
      generate, by the user device, a resource transmission request, wherein the resource transmission request is associated with at least one resource account;
      determine, based on the satellite-based communication component, a satellite-based communication transmission volume;
      generate, based on the satellite-based communication transmission volume, a resource transmission satellite communication, wherein the resource transmission satellite communication comprises at least a portion of the resource transmission request;
      transmit, via a satellite component, the resource transmission satellite communication to a resource transmission processing component; and
      allow, in an instance where the at least one resource account meets the resource transmission request, the resource transmission request.

2. The system of claim 1, wherein the computer-readable code causes the at least one processing device to perform the following operation
   receive, from a satellite associated with the satellite-based communication component, a resource transmission satellite communication acknowledgement, wherein the resource transmission satellite communication acknowledgement comprises an acknowledgement of the received resource transmission satellite communication.

3. The system of claim 2, wherein the computer-readable code causes the at least one processing device to perform the following operations:
   generate, based on the satellite-based communication transmission volume, the resource transmission satellite communication,
      wherein, in an instance where the resource transmission request exceeds the satellite-based communication transmission volume, the resource transmission satellite communication comprises a sequence of a plurality of portions of the resource transmission request;
   transmit, based on the sequence of resource transmission request, the resource transmission satellite communication comprising the plurality of portions to the satellite component associated with the satellite-based communication component; and
   receive, from the satellite component, at least one resource transmission satellite communication acknowledgement for the resource transmission satellite communication.

4. The system of claim 1, wherein the computer-readable code causes the at least one processing device to perform the following operation
   receive, from the resource transmission processing component, a resource transmission processing component acknowledgement, wherein the resource transmission processing component acknowledgement comprises an acknowledgement of the received resource transmission satellite communication.

5. The system of claim 1, wherein the resource transmission request comprises a request to receive a resource at the resource account.

6. The system of claim 5, wherein the computer-readable code causes the at least one processing device to perform the following operations:
   receive a current geolocation data of the user device, wherein the current geolocation data comprises a geolocation of the user device at a time of the resource transmission request;
   determine, based on the geolocation of the user device, a resource type identifier;
   identify a received resource associated with the resource transmission request, wherein the received resource comprises a received resource type identifier; and
   determine whether to convert a received resource type of the received resource,
      wherein, in an instance where the received resource type identifier matches the resource type identifier, do not convert the resource type of the received resource type to a resource type of the resource type identifier, or
      wherein, in an instance where the received resource type identifier does not match the resource type identifier, convert the resource type of the received resource type to a resource type of the resource type identifier.

7. The system of claim 1, wherein the computer-readable code causes the at least one processing device to perform the following operations:
   identify a resource shipping object, wherein the resource shipping object comprises a physical resource associated with the resource transmission request and at least one satellite-based communication component;
   receive a current geolocation data of the resource shipping object, wherein the current geolocation data is based on the at least one satellite-based communication component;
   determine an intended recipient geolocation data of the resource transmission request;

compare the current geolocation data and the intended recipient geolocation data; and
automatically, in an instance where the current geolocation data and the intended recipient geolocation matches at a first time, allow the resource transmission request.

8. The system of claim 7, wherein the computer-readable code causes the at least one processing device to perform the following operation
identify the current geolocation data of the resource shipping object, wherein the current geolocation data is based on at least one satellite-image of the resource shipping object.

9. The system of claim 8, wherein the current geolocation data of the resource shipping object is received at pre-determined periodic periods.

10. The system of claim 8, wherein the current geolocation data of the resource shipping object is identified at pre-determined periodic periods.

11. The system of claim 1, wherein the user device is configured with a resource processing computing application.

12. The system of claim 1, wherein the user device is a resource processing device.

13. The system of claim 1, wherein the resource transmission request comprises at least one of a request to transmit a resource from the resource account or a request to receive a resource at the resource account.

14. A computer program product for generating resource transmissions using satellite-based communications, wherein the computer program product comprises at least one non-transitory computer-readable medium having computer-readable program code portions embodied therein, the computer-readable program code portions which when executed by a processing device are configured to cause the processor to perform the following operations:
identify a user device, wherein the user device comprises a satellite-based communication component;
generate, by the user device, a resource transmission request, wherein the resource transmission request is associated with at least one resource account;
determine, based on the satellite-based communication component, a satellite-based communication transmission volume;
generate, based on the satellite-based communication transmission volume, a resource transmission satellite communication, wherein the resource transmission satellite communication comprises at least a portion of the resource transmission request;
transmit, via a satellite component, the resource transmission satellite communication to a resource transmission processing component; and
allow, in an instance where the at least one resource account meets the resource transmission request, the resource transmission request.

15. The computer program product of claim 14, wherein the resource transmission request comprises a request to receive a resource at the resource account.

16. The computer program product of claim 15, wherein the processing device is further configured to cause the processor to perform the following operations:
receive a current geolocation data of the user device, wherein the current geolocation data comprises a geolocation of the user device at a time of the resource transmission request;
determine, based on the geolocation of the user device, a resource type identifier;
identify a received resource associated with the resource transmission request, wherein the received resource comprises a received resource type identifier; and
determine whether to convert a received resource type of the received resource,
wherein, in an instance where the received resource type identifier matches the resource type identifier, do not convert the resource type of the received resource type to a resource type of the resource type identifier, or
wherein, in an instance where the received resource type identifier does not match the resource type identifier, convert the resource type of the received resource type to a resource type of the resource type identifier.

17. The computer program product of claim 14, wherein the processing device is further configured to cause the processor to perform the following operations:
identify a resource shipping object, wherein the resource shipping object comprises a physical resource associated with the resource transmission request and at least one satellite-based communication component;
receive a current geolocation data of the resource shipping object, wherein the current geolocation data is based on the at least one satellite-based communication component;
determine an intended recipient geolocation data of the resource transmission request;
compare the current geolocation data and the intended recipient geolocation data; and
automatically, in an instance where the current geolocation data and the intended recipient geolocation matches at a first time, allow the resource transmission request.

18. A computer-implemented method for generating resource transmissions using satellite-based communications, the computer-implemented method comprising:
identifying a user device, wherein the user device comprises a satellite-based communication component;
generating, by the user device, a resource transmission request, wherein the resource transmission request is associated with at least one resource account;
determining, based on the satellite-based communication component, a satellite-based communication transmission volume;
generating, based on the satellite-based communication transmission volume, a resource transmission satellite communication, wherein the resource transmission satellite communication comprises at least a portion of the resource transmission request;
transmitting, via a satellite component, the resource transmission satellite communication to a resource transmission processing component; and
allowing, in an instance where the at least one resource account meets the resource transmission request, the resource transmission request.

19. The computer-implemented method of claim 18, wherein the resource transmission request comprises a request to receive a resource at the resource account.

20. The computer-implemented method of claim 19, the computer-implemented method further comprising:
receiving a current geolocation data of the user device, wherein the current geolocation data comprises a geolocation of the user device at a time of the resource transmission request;
determining, based on the geolocation of the user device, a resource type identifier;

identifying a received resource associated with the resource transmission request, wherein the received resource comprises a received resource type identifier; and determining whether to convert a received resource type of the received resource,
- wherein, in an instance where the received resource type identifier matches the resource type identifier, not converting the resource type of the received resource type to a resource type of the resource type identifier, or
- wherein, in an instance where the received resource type identifier does not match the resource type identifier, converting the resource type of the received resource type to a resource type of the resource type identifier.

\* \* \* \* \*